Patented Dec. 18, 1923.

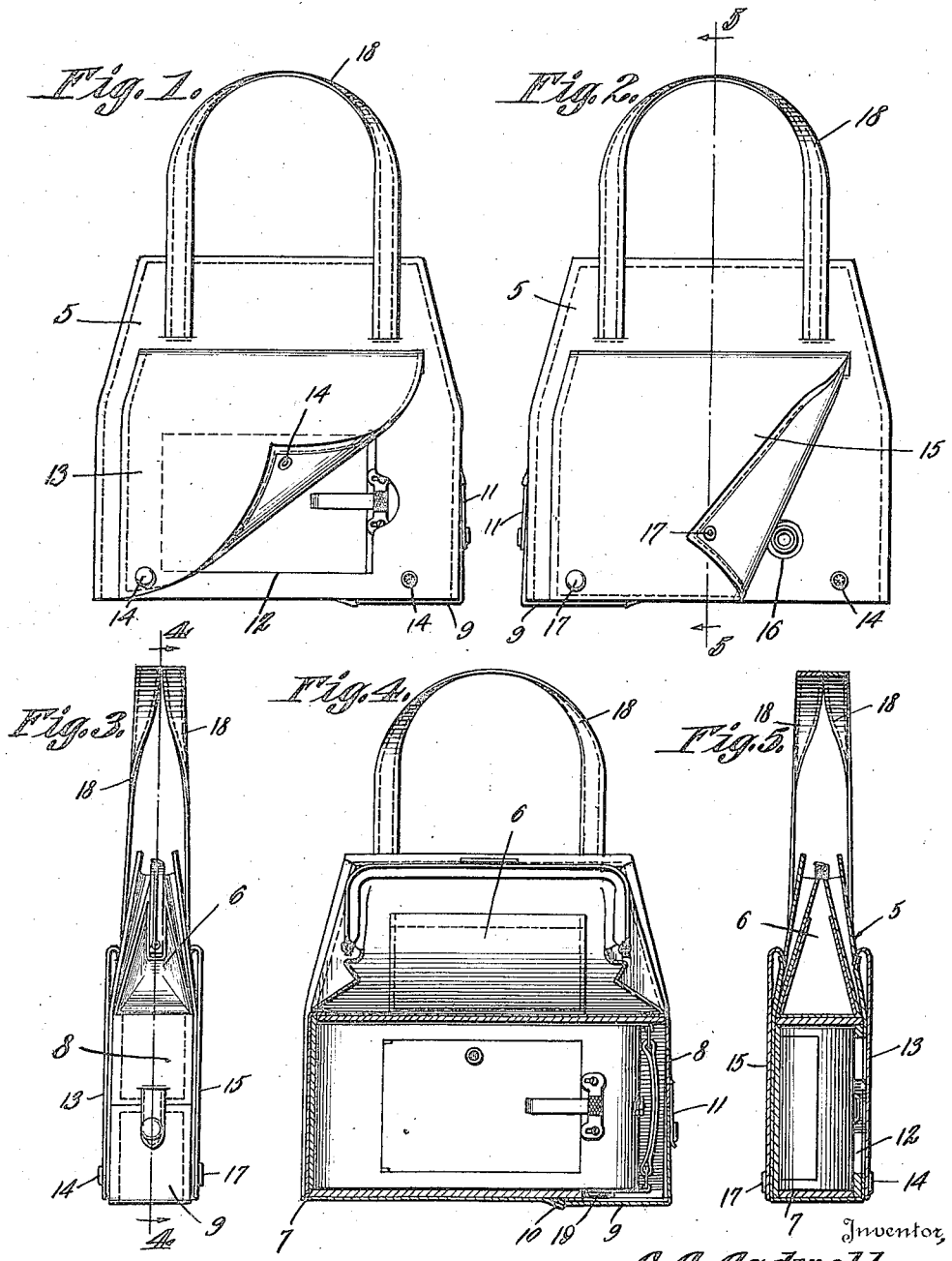
Dec. 18, 1923.
C. C. CADWELL
1,478,202
COMBINATION HAND BAG AND CAMERA CARRYING CASE
Filed Dec. 9, 1921

1,478,202

UNITED STATES PATENT OFFICE.

CARL CURTIS CADWELL, OF ROCHESTER, MINNESOTA.

COMBINATION HAND BAG AND CAMERA-CARRYING CASE.

Application filed December 9, 1921. Serial No. 521,155.

*To all whom it may concern:*

Be it known that I, CARL CURTIS CADWELL, a citizen of the United States, residing at Rochester, in the county of Olmsted and State of Minnesota, have invented a new and useful Combination Hand Bag and Camera-Carrying Case, of which the following is a specification.

This invention relates to package and article carriers, and more particularly to package and article carriers for personal use, the primary object of the invention being to provide a combined pocketbook or hand bag and camera carrier.

Another object of the invention is to provide a carrier of this character having side flaps, said flaps adapted to be raised to permit the use of the camera, eliminating the necessity of removing the camera to snap a picture.

Another object of the invention is to provide a carrier of this character having side flaps and end flaps, said flaps adapted to be raised or manipulated to permit the film winding mechanism to be operated and the film registering window exposed to view without removing the camera from the case.

Another object of the invention is to provide a camera carrying case so constructed to permit the use of the camera, eliminating the necessity of removing the camera to take a picture, also to permit the film winding mechanism to be operated, and the film registering window exposed to view without removing the camera from the case.

A still further object of the invention is to provide a carrier wherein the camera may be readily and easily removed for loading purposes.

With the foregoing and other objects in view which will appear as the description proceeds, the invention resides in the combination hand bag or article carrier and camera carrying case, also a camera carrying case not in combination with the article carrier, so constructed as to permit the taking of a picture, without removing the camera from the case and so constructed to permit the film winding mechanism to be operated and the film registering window exposed to view without removing the camera from the case.

It is to be understood that changes in the precise embodiment of the invention herein disclosed, may be made within the scope of what is claimed, without departing from the spirit of the invention.

Referring to the drawing:

Figure 1 is a side elevational view of a carrier constructed in accordance with the present invention, one side flap being turned partially upwardly to disclose the camera.

Figure 2 is a side elevational view of the container disclosing the opposite side thereof, and showing one flap as partially turned upwardly to disclose the sight opening of the camera.

Figure 3 is an end elevational view of the container.

Figure 4 is a sectional view taken on line 4—4 of Figure 3.

Figure 5 is a sectional view taken on line 5—5 of Figure 2.

Referring to the drawing in detail, the body portion of the carrier is designated generally by the reference character 5, and includes an upper coin compartment 6, and a lower camera compartment 7, the upper coin compartment being provided with the usual jaws and locking means employed in pocket-book constructions.

The camera containing compartment has one of its ends closed by means of the flap 8, and flap 9, the latter flap being secured to the bottom wall of the camera compartment at 10, so that the flap may fall downwardly out of the path of travel of the camera, when the same is being removed. By moving these flaps to their open positions, the winding key 19 may be manipulated eliminating the necessity of removing the camera to accomplish this operation. In order that the flaps 8 and 9 may be held in their closed positions, a suitable fastening means indicated at 11 is provided. It is to be understood however that the means for closing the various openings may be flaps, slides or other suitable means, flaps preferred. By releasing fastener 11, the end flap 9 is allowed to drop downward, thus exposing the film winding key 19.

One of the side walls of the camera compartment is formed with a cut out portion 12 which is of a size to permit the front hinged wall of a camera to be extended therethrough, to facilitate the snapping of a picture while the camera is contained within the carrier. A flap 13 is secured to the side wall of the container and is designed to overlie the cut out portion 12 to close the same, glove fasteners 14 being provided to hold the flap 13 in its normal or closed position.

On the opposite side of the container is provided a flap 15 which may be moved upwardly to uncover the opening 16 formed in one side wall of the container, and through which opening the film number of the film in the camera may be viewed.

Glove fasteners 17 are also employed in connection with the flap 15 for normally holding the same closed. For the convenience of the carrier, handles 18 are provided, the handles being formed preferably of the same kind of material as the body portion of the carrier.

In the use of the device, it is obvious that when it is desired to snap a picture, it is only necessary to move the flap 13 upwardly, and move the usual hinged closure of a camera to expose the lens thereof.

After the camera has been used, the hinged closure thereof is folded to its normal position, and the flap 13 snapped into position by means of the fasteners 14, whereupon the combined coin and camera carrier, simulates the usual pocketbook carried by a person.

Having thus described the invention, what is claimed as new is:—

1. In a carrier, an upper section formed of hinged members, a lower camera containing section, having an open end, means for closing the open end of the lower section, said lower section having an opening in the side wall thereof to expose a portion of the camera supported in the camera containing section, and a flexible covering for closing the opening formed in the side wall of the camera containing section.

2. In a carrier, an upper section formed of hinged members, a lower camera containing section having an opening at one end thereof, and having openings in the side walls thereof, the openings in the side walls of the lower section adapted to expose portions of the camera supported therein, and flexible covers for closing the openings in the side walls of the container.

In testimony that I claim the foregoing as my own, I have hereto affixed my signature in the presence of two witnesses.

CARL CURTIS CADWELL.

Witnesses:
MILDRED OWEN,
JOHN FIERS.